(12) United States Patent
Zuyev et al.

(10) Patent No.: US 8,523,968 B2
(45) Date of Patent: Sep. 3, 2013

(54) ABRASIVE ARTICLE WITH IMPROVED PACKING DENSITY AND MECHANICAL PROPERTIES AND METHOD OF MAKING

(75) Inventors: Konstantin S. Zuyev, Grafton, MA (US); Joel Alan Fife, Worcester, MA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 702 days.

(21) Appl. No.: 12/624,572

(22) Filed: Nov. 24, 2009

(65) Prior Publication Data

US 2010/0154316 A1    Jun. 24, 2010

Related U.S. Application Data

(60) Provisional application No. 61/140,289, filed on Dec. 23, 2008.

(51) Int. Cl.
| | |
|---|---|
| *B24D 3/00* | (2006.01) |
| *B24D 99/00* | (2010.01) |
| *C09C 1/68* | (2006.01) |
| *C09K 3/14* | (2006.01) |

(52) U.S. Cl.
USPC .............................................. 51/308; 51/293

(58) Field of Classification Search
None
See application file for complete search history.

(56) References Cited

U.S. PATENT DOCUMENTS

| | | | |
|---|---|---|---|
| 3,966,432 A | | 6/1976 | Rayner |
| 5,127,197 A | | 7/1992 | Brukvoort et al. |
| 5,213,589 A | | 5/1993 | Ronning et al. |
| 5,611,827 A | | 3/1997 | Hammarstrom et al. |
| 5,827,337 A | | 10/1998 | Keil |
| 5,928,070 A | | 7/1999 | Lux |
| 5,976,204 A | * | 11/1999 | Hammarstrom et al. ....... 51/298 |
| 6,451,076 B1 | | 9/2002 | Nevoret et al. |
| 6,485,533 B1 | | 11/2002 | Ishizaki et al. |
| 6,514,302 B2 | | 2/2003 | Lemberger et al. |
| 6,527,817 B1 | | 3/2003 | Fang et al. |
| 6,645,265 B1 | | 11/2003 | Wang |

(Continued)

FOREIGN PATENT DOCUMENTS

| | | |
|---|---|---|
| TW | 218889 | 1/1994 |
| TW | 200406283 A | 5/2004 |

(Continued)

OTHER PUBLICATIONS

Sohn et al., The Effect of Particle Size Distribution on Packing Density, Jun. 1968, The Canadian Journal of Chemical Engineering, vol. 46, pp. 162-167.*

(Continued)

*Primary Examiner* — Kaj K Olsen
*Assistant Examiner* — Jared Wood
(74) *Attorney, Agent, or Firm* — Abel Law Group, LLP; Joseph P. Sullivan (57) ABSTRACT

A bonded abrasive article including a plurality of abrasive grains and an organic bond material, and a method for making said bonded abrasive article, are described herein. The abrasive article has a non-reinforced yield strength of at least about 28 MPa. An abrasive mix is also described herein, including abrasive grains, a bond material and an agglomeration inhibitor. The abrasive mix has a loose bond content that is less than approximately 9.9 %.

23 Claims, 7 Drawing Sheets

(56) References Cited

U.S. PATENT DOCUMENTS

| | | |
|---|---|---|
| 6,949,129 B2 | 9/2005 | Simon |
| 6,953,489 B2 | 10/2005 | Choi et al. |
| 7,267,604 B2 | 9/2007 | Yoshizawa et al. |
| 2002/0043027 A1 | 4/2002 | Sakai et al. |
| 2004/0154230 A1 | 8/2004 | Wang et al. |
| 2004/0209554 A1 | 10/2004 | Tsumagari et al. |
| 2005/0260928 A1 | 11/2005 | Huh et al. |
| 2008/0014840 A1 | 1/2008 | Sankaranarayanan |

FOREIGN PATENT DOCUMENTS

| | | |
|---|---|---|
| TW | 426588 B | 3/2011 |
| WO | 9304819 A1 | 3/1993 |
| WO | 9928087 A1 | 6/1999 |

OTHER PUBLICATIONS

Patent Cooperation Treaty, International Preliminary Report on Patentability and Written Opinion of the International Searching Authority for PCT Application No. PCT/US2009/067960 dated Jun. 29, 2011, 7 pages.

PCT Application No. PCT/US2009/067960, Filed Dec. 15, 2009, "Notification of Transmittal of the International Search Report and the Written Opinion of the International Searching Authority, or the Declaration", dated Jul. 29, 2010, 10 pages.

* cited by examiner

FIG. 1

PRIOR ART

ABRASIVE ARTICLE WITH IMPROVED PACKING DENSITY AND MECHANICAL PROPERTIES AND METHOD OF MAKING

CROSS REFERENCE TO RELATED APPLICATIONS

This application claims the benefit of U.S. Provisional Application Ser. No. 61/140,289 filed on Dec. 23, 2008 and entitled "ABRASIVE ARTICLE WITH IMPROVED PACKING DENSITY AND MECHANICAL PROPERTIES AND METHOD OF MAKING", which is incorporated by reference herein in its entirety.

BACKGROUND

The present invention relates generally to abrasive articles and more particularly to an abrasive article with improved packing density and mechanical properties and a method for making this article.

Abrasive articles are typically used in various industries to machine work pieces by cutting, lapping, grinding, or polishing. The use of abrasive articles for machining spans a wide industrial scope from optics industries, automotive plant repair industries to metal fabrication industries. In each of these examples, manufacturing facilities use abrasives to remove bulk material and/or affect surface characteristics of products (e.g., planarity, surface roughness).

Manufacturers of rough grinding abrasive articles are constantly challenged to make abrasive articles that meet higher performance requirements specified by their customers. Manufacturers typically try to meet such high performance requirements by packing more abrasive mix into the articles and attaining improvements in strength to withstand aggressive grinding conditions. Current approaches in forming these abrasive articles have limited extent to which manufacturers can increase density of abrasives and improve strength. In particular, these approaches do not adequately process the materials used to produce the abrasive mix that forms the abrasive articles. Inadequate processing of the materials typically results in abrasive mixes having abrasive grains interspersed with a significant amount of loose bond content. The nature of the loose bond material lowers manufacturers' ability to pack more mix in the same volume for the purpose of increasing packing density. In addition, the loose bond acts as a weak link in the abrasive article, thus making the abrasive product weaker. As a result, it is difficult to meet higher performance requirements.

SUMMARY

In one embodiment, there is an abrasive mix comprising abrasive grains, a bond material and an agglomeration inhibitor agent at least partially coating the abrasive grains and bond material. The abrasive mix has a loose bond content that is less than about 9.9%.

In a second embodiment, there is a bonded abrasive article that comprises a plurality of abrasive grains and an organic bond material. The abrasive article has a non-reinforced yield strength that is at least about 28 MPa.

In a third embodiment, there is a method of forming an abrasive article. The method comprises: providing abrasive grains; introducing at least one processing liquid to the abrasive grains; mixing the at least one processing liquid with the abrasive grains to form wetted abrasive grains; adding and mixing a bond material with the wetted abrasive grains to form an abrasive mix; at least partially coating the abrasive mix with an agglomeration inhibitor agent to form a coated abrasive mix having a loose bond content that is less than about 9.9%; and forming the coated abrasive mix into the abrasive article.

DETAILED DESCRIPTION OF THE EMBODIMENTS

Figure 1:
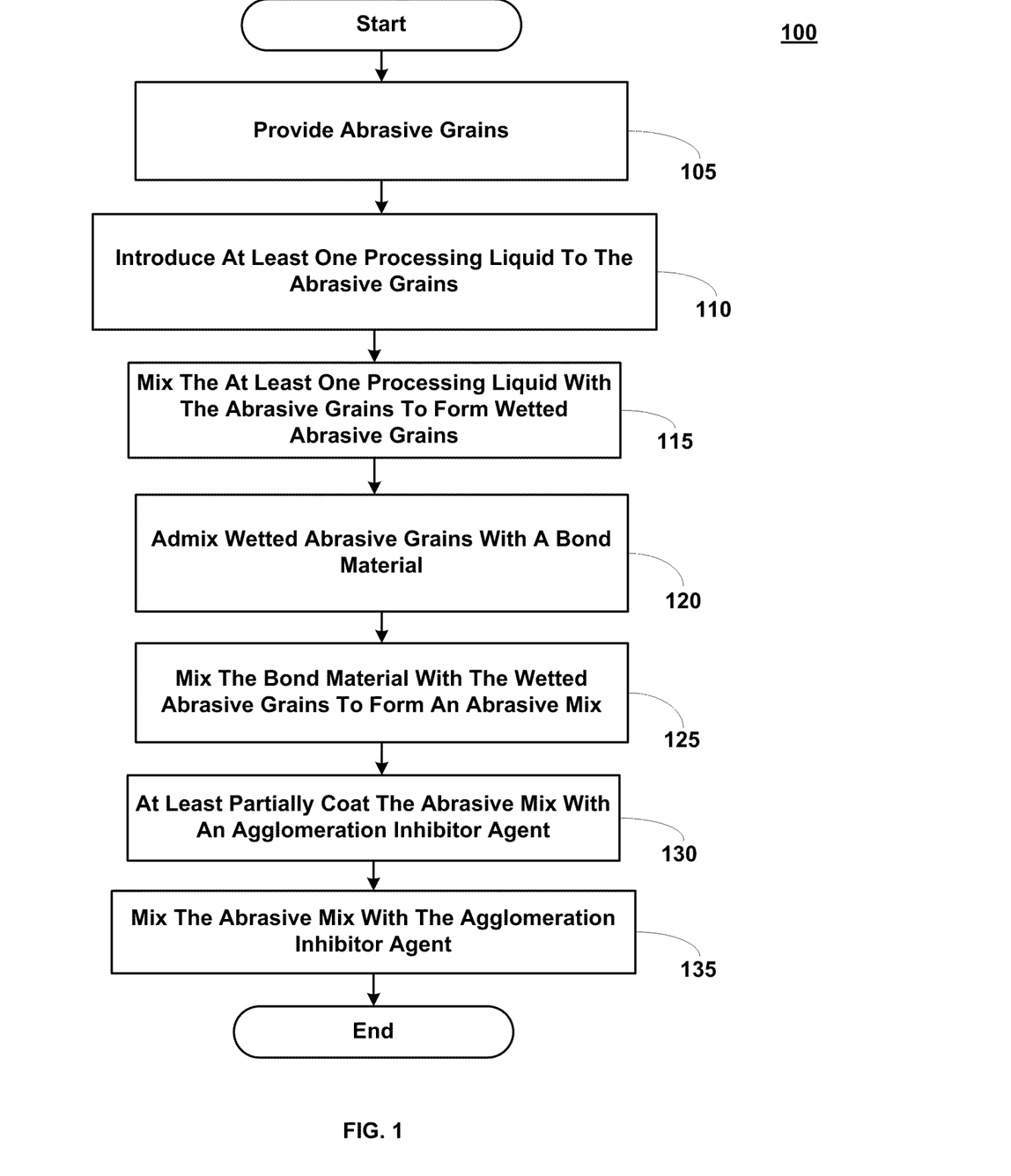
FIG. 1 is a flow chart describing a process for forming an abrasive mix according to one embodiment.

Referring to the drawings, FIG. 1 is a flow chart 100 describing a process for forming an abrasive mix according to one embodiment. The process begins by providing abrasive grains to a mixing container at 105. In this embodiment, the abrasive grains may be any conventional abrasive or superabrasive material. A non-exhaustive list of abrasives and superabrasives that may be used in this embodiment includes aluminum oxide grains (e.g., implanted with impurities), zirconium fluoride, zirconium sulfate, aluminum oxide and zirconium oxide, zirconia-alumina grains, silicon carbide grains, diamond grains, cubic boron nitride grains and combination of all mentioned above. Those skilled in the art will recognize that combinations of one or more of the abrasives listed above may be used as abrasive grains in this embodiment.

The mixing container is typically a large industrial-sized mixing bowl having a mixing mechanism driven by an electric motor that is configured to mix contents of material while the bowl rotates at specified revolutions per minute. In one embodiment, the total amount of abrasive grains added to the mixing container in the process of FIG. 1 is about 150 lbs.

After adding the abrasive grains to the mixing container, at least one processing liquid is introduced to the grains at 110. A non-exhaustive list of processing liquids that may be used in this embodiment includes liquid resins, water, wax and resin modifiers, and various solvents such as Furfural and Tridecyl Alcohol. Those skilled in the art will recognize that combinations of one or more of the processing liquids listed above may be used in this embodiment.

The amount of processing liquid(s) that are introduced to the grains will depend on the type of abrasive grain that is used. Generally, the amount of content of processing liquid(s) that are added to the grains in the mixing container ranges from about 10 lbs to about 20 lbs. It is advantageous to add this amount of processing liquid to the abrasive grains in order to prevent loose bond content from forming in the resulting abrasive mix. Loose bond content in the abrasive mix adversely affects the packing density of the abrasive mix and consequently the strength of abrasive articles made from the abrasive mix. Conventional processes used to produce abrasive mixes generally use a content of processing liquid that ranges from about 5 lbs to about 10 lbs.

In the process of FIG. 1, the processing liquid(s) are introduced to the abrasive grains in the rotating mixing container as the mixing mechanism stirs the grains. In one embodiment, the processing liquid(s) are introduced to the rotating abrasive grains at a rate of 2 to 3 lbs/min. The processing liquid(s) and abrasive grains can be mixed at 115 for a period of time that ranges from about two to about three minutes to form wetted abrasive grains.

In certain embodiments, a bond material is prepared and placed in another mixing container that is similar to the first container. In one embodiment, the primary or major fraction of the bond material consists essentially of art-recognized organic bond material, such as one or more organic resins—e.g. epoxy, polyester, phenolic, and cyanate ester resins, or other suitable thermosetting or thermoplastic resins. Specific, non-limiting examples of resins that can be used include the following: the resins sold by Dynea Oy, Finland, under the trade name Peracit.®. and available under the catalog/product numbers 8522G, 8723G, and 8680G; the resins sold by Hexion Specialty Chemicals, OH, under the trade name Rutaphen.®. and available under the catalog/product numbers 9507P, 8686SP, and 8431SP; and the resins sold by Durez Corporation, TX, under the following catalog/product numbers: 29722, 29344, and 29717. In a preferred embodiment, the bond material comprises a dry resin material. Those skilled in the art will recognize that various fillers may be added to the bond material in order to enhance an abrasive article's ability to cut, lap, grind, or polish. For example, a corrosive filler can be used to corrode the surface of steel and enhance the ability of an abrasive mix to penetrate and cut steel. The fillers may include active and/or inactive fillers. A non-exhaustive list of fillers includes Lime, Iron Pyrite, Zinc Sulfide, Cryolite, Potassium Sulfate, Potassium Chloride/Sulfate blend, MKC-S.

In certain embodiments, the bond material is mixed in this second mixing container for a period of time that ranges from about 15 seconds to about 3 minutes in order to loosely distribute the bond material. Referring back to FIG. 1, the wetted abrasive grains are then admixed with the bond material at 120. In one embodiment, the first mixing container containing the wetted abrasive grains is elevated through pneumatic control and then tilted to introduce them to the bond material. The wetted abrasive grains and bond material are mixed at 125 for a period of time that ranges from about 15 seconds to about 5 minutes or until the bond material is adequately mixed with the wetted abrasive grains such that there is minimal loose bond content present. The mixing of the wetted abrasive grains and the bond material results in the formation of an abrasive mix.

The typical abrasive mix formed using a conventional process at this point would have unfavorable loose bond content that adversely affects the packing density of the abrasive mix and consequently the strength of any abrasive articles made from the abrasive mix. The abrasive mix formed from the process of FIG. 1 is not adversely affected by loose bond content because the amount of processing liquids (i.e., from about 10 lbs to about 20 lbs), which is nearly double the amount used in conventional processes, has been shown to be enough to facilitate significant adherence of the bond material to the abrasive grains. Conventional processes may use a processing liquid amount that ranges from about 5 lbs to less than about 10 lbs. Because of the amount of processing liquids that is used in conventional processes, typically the bond material will adhere poorly to the abrasive grains, resulting in unfavorable amounts of loose bond content in the abrasive mixes formed from these conventional processes.

Referring back to FIG. 1, the process continues with at least partially coating the abrasive mix after its formation with an agglomeration inhibitor agent at 130. As used herein, the agglomeration inhibitor agent acts as a lubricant agent that prevents grains of the abrasive mix from sticking together. Because additional processing liquids are used in this process there is a greater tendency for the grains of the abrasive mix to adhere to each other, making it difficult to use the mix for producing an abrasive article. In particular, these abrasive mixes are often used to fill a mold that is used to form an abrasive article, and therefore it is desirable to have an abrasive mix that is free-flowing and capable of being spread on a substrate that may be placed in this mold. The additional processing liquids used in the abrasive mix will result in a mix that forms like rock, making it extremely difficult to break up and use and spread in a mold. By effectively coating the abrasive mix with the agglomeration inhibitor agent and mixing them at 135, the abrasive grains of the mix are substantially inhibited from adhering to each other or to various elements of the bond material.

In one embodiment, the agglomeration inhibitor agent comprises a fumed oxide. A non-exhaustive list of fumed oxides that may be used includes fumed silica or fumed silicon dioxide, fumed aluminum oxide or fumed alumina, fumed magnesia, and fumed calcium oxide, any of which may be used as naturally occurring (if applicable) or synthetic items.

Some fumed oxides have been used previously in the formation of abrasive mixes but only as fillers, which as pointed out above are introduced in earlier process mixing stages. Using the fumed oxide as a filler teaches away from the concept of using the fumed oxide as an agglomeration inhibitor agent. In particular, a fumed oxide that is used as a filler will become incorporated within the grain structure as a result of the mixing actions and will not have any lubricating properties available on the outside of the grain structure. In essence, the use of a fumed oxide as a filler serves to have an aggregation effect on the abrasive mix (i.e., to promote adherence of the mix) as opposed to the purpose used herein, which is to inhibit agglomeration of the abrasive mix by (i.e., lubricate and promote free flowing of the mix).

Those skilled in the art will recognize that other lubricant agents can be used as the agglomeration inhibitor agent. For example, wax products such as paraffin can be used.

In one embodiment, the amount of agglomeration inhibitor agent that is admixed with the abrasive mix is in a range of about 0.0001 to about 10 percent by weight of the abrasive mix. A preferred range of the amount is in a range of about 0.01 to about 3 percent by weight of the abrasive mix.

Figure 2:
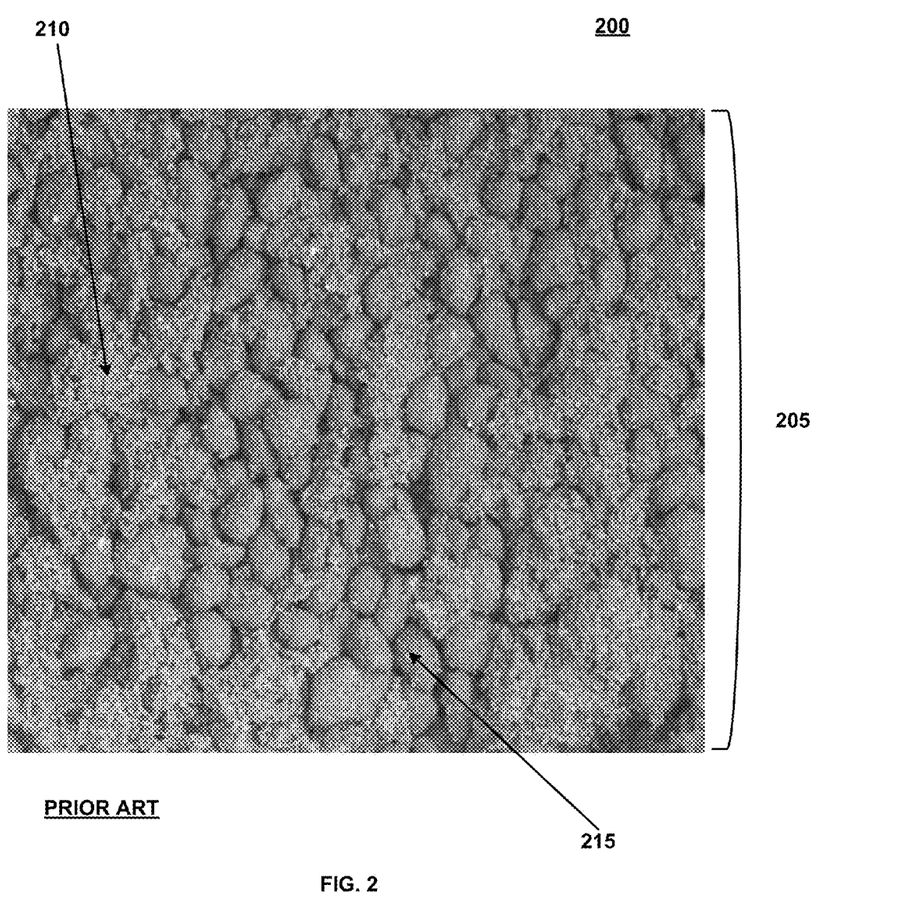
FIG. 2 is an image of an abrasive mix formed from a conventional process.

FIG. 2 is an image 200 of an abrasive mix 205 formed from a conventional process in which only a range of about 5 lbs to less than about 10 lbs of processing liquids has been used in the formation of the mix. Because of the nature of the composition used to make abrasive mix 205, there are not enough liquids to facilitate full adherence of the bond material. As a result, abrasive mix 205 that forms after the mixing of the abrasive grains and bond material has unfavorable amounts of loose bond content 210 interspersed among abrasive grains 215.

As is well known in the art, loose bond content for abrasive mixes can be measured by sieving through a set of plastic or metal screens of certain mesh sizes. Using this approach herein, it has been shown that various embodiments of the present abrasive mix have a loose bond content that is less than about 9.9%.

Packing density of the abrasive mix depends on the amount of loose bond. As explained above, rough grinding abrasive manufacturers want to produce abrasive articles that are formed from abrasive mixes that are characterized as having increased density. An increased density results in abrasive articles that are stronger, more durable and more resistant to breakage in aggressive applications. Loose packed density is one measurement that skilled artisans use to measure the density of abrasive mixes. Loose packed density as measured herein is attained by filling a cylinder having a volume of 100 cm$^3$ with abrasive mix and determining how much mix was used to fill that volume. Using this approach, it has been determined that abrasive mix 205 having a loose bond content of 9.9% has a loose packed density that equals 1.56 g/cc (i.e., 156 grams of abrasive mix 205 filled the 100 cm$^3$ cylinder).

Figure 3:
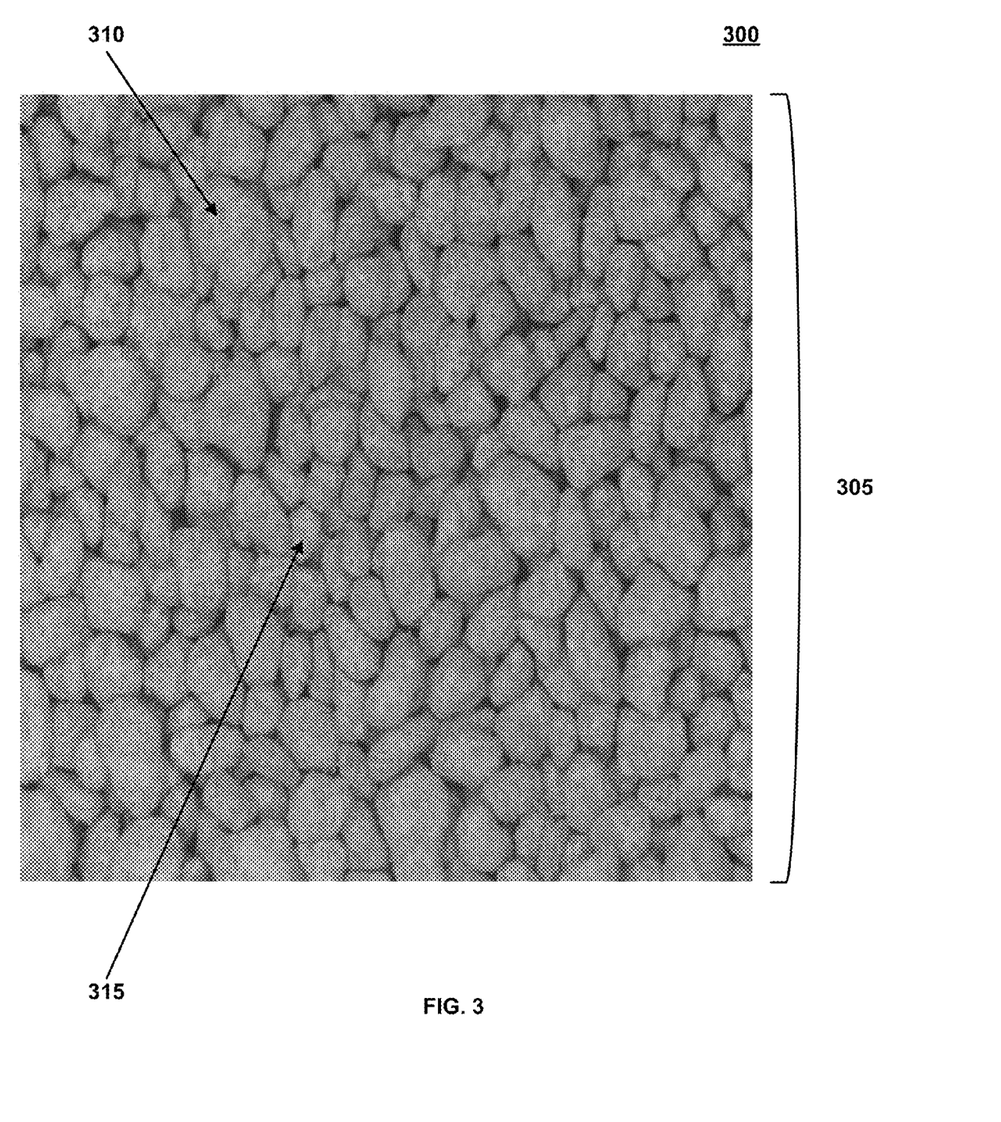
FIG. 3 is an image of an abrasive mix formed from the process depicted in FIG. 1.

FIG. 3 is an image 300 of an abrasive mix 305 formed from the process depicted in FIG. 1. As mentioned above, the process of FIG. 1 uses a content of processing liquids that ranges from about 10 lbs to about 20 lbs, which is almost double the amount of liquids used in the formation of abrasive mix 205 of FIG. 2. Because of the particular amount of processing liquids used in the process of FIG. 1, there is substantial adherence of the bond material to the abrasive grains. As a result, abrasive mix 305 that forms after the mixing of the wetted abrasive grains and bond material does not show significant amounts of loose bond content. Using the approach described above to measure loose bond content, it has been shown that abrasive mix 305 has a loose bond content that is equal to about 2.4%. Although the loose bond content measured about 2.4% in this example, it is shown below that the loose bond content for abrasive mixes formed from the process described with respect to FIG. 1 can range from about 0.1% to about 9.9%.

Using the approach described above to measure loose packed density, it has been shown that that abrasive mix 305 has a loose packed density that is equal to about 1.69 g/cc. Although the loose packed density measured about 1.69 g/cc in this example, it is noted below that is possible to obtain loose pack density measurements that are greater than about 1.56 g/cc, with ranges of about 1.6 g/cc to about 1.75 g/cc, being the range covering typical results from the process of FIG. 1.

Another characteristic that can arise from using the process of FIG. 1 to form an abrasive mix is that there can be a wide distribution of abrasive grains in the mix that range from small sized grains to large sized grains, with the small sized grains interspersed with the large sized grains. FIG. 3 shows that exemplary abrasive mix 305 comprises large sized grains 310 and small sized grains 315. As used herein, small sized grains have an equivalent diameter that ranges from about 0.1 mm to about 3 mm and the large sized grains have a thickness that ranges from about 2.5 mm to about 6 mm. This characteristic of a wide distribution of abrasive grains is in contrast to abrasive mix 205 in FIG. 2 which shows generally large size grains interspersed with loose bond content. Generally, this wide distribution of abrasive grains in FIG. 3 contributes to the optimized volume of abrasive mix 305 and the significant increases in loose packed density as compared to abrasive mix 205 of FIG. 2.

Figure 4:
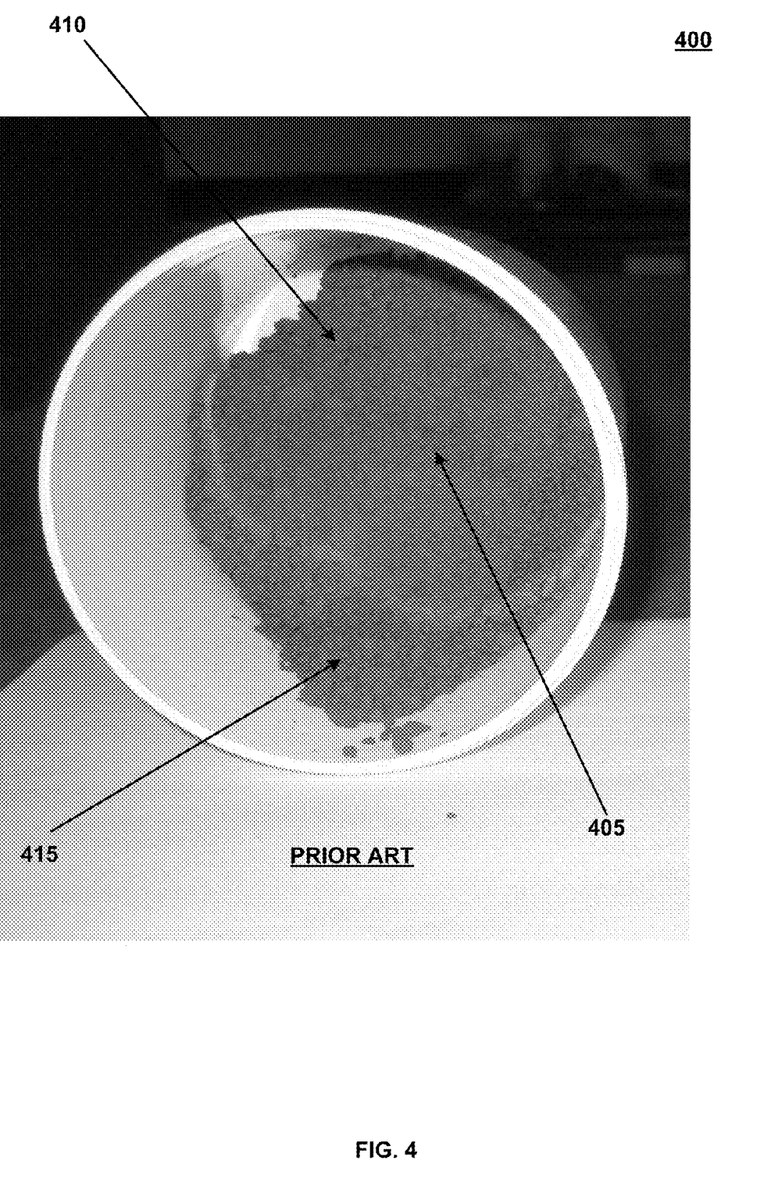
FIG. 4 is another image of an abrasive mix formed from the conventional process.

FIG. 4 is another image 400 of an abrasive mix formed from the conventional process. Image 400 illustrates an abrasive mix 405 formed from a conventional process that is not free flowing and readily suited for processing in a mold from the perspective of making abrasive articles. In particular, image 400 shows abrasive mix 405 having a large portion of agglomeration 410 and only a small portion of free flowing mix 415. The large portion of agglomeration 410 results from the fact that abrasive grains coated with bond material (which collectively after mixing includes the loose bond content) become very sticky and prone to adhering to one another. Often this large portion of agglomeration 410 becomes solid like a rock after exposure to the open atmosphere, making it very difficult to break apart and work with in a mold to make an abrasive article. As a result, typically this large portion of agglomeration 410 has to be discarded.

Figure 5:
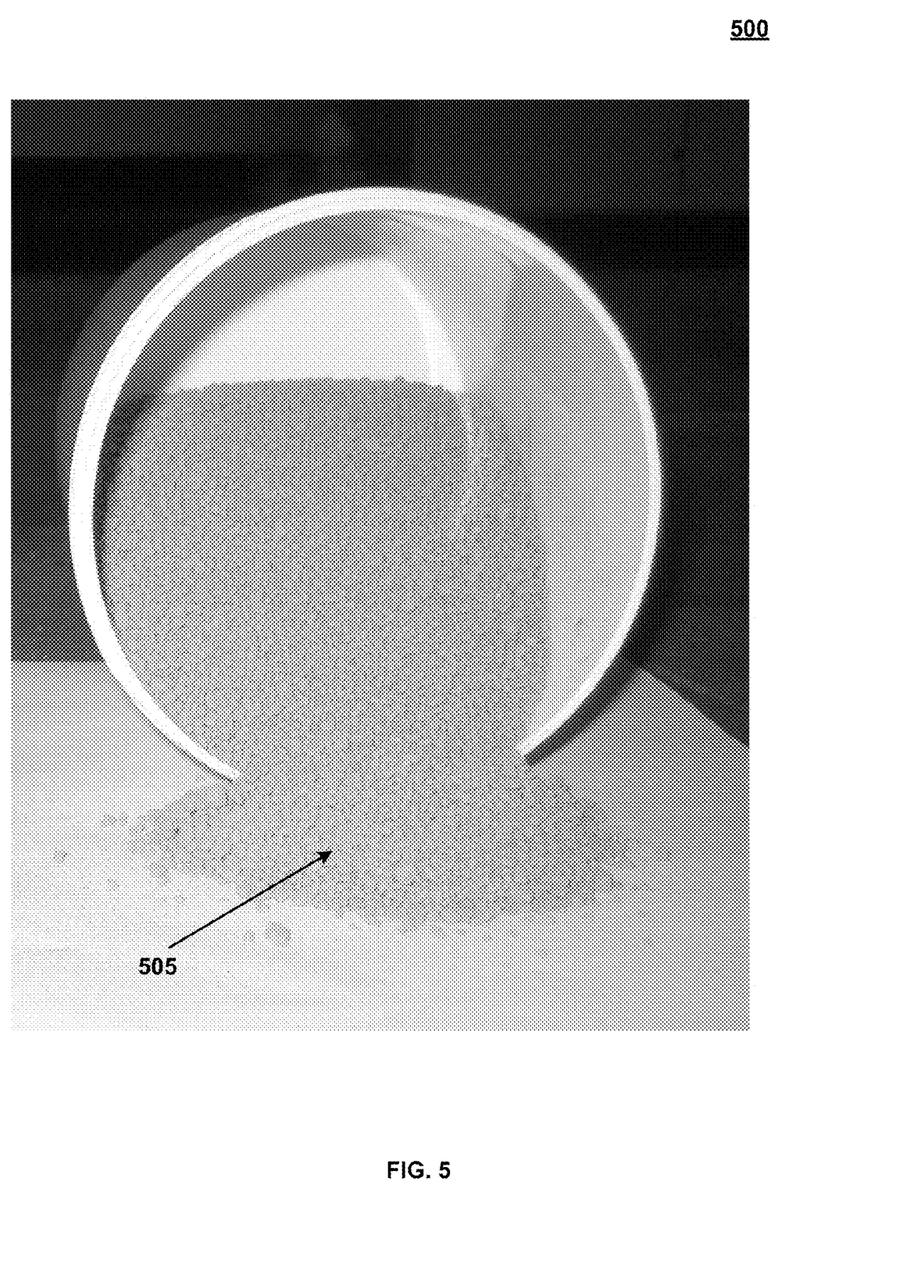
FIG. 5 is another image of an abrasive mix formed from the process depicted in FIG. 1.

In contrast to FIG. 4, FIG. 5 shows an image 500 of an abrasive mix 505 formed from the process depicted in FIG. 1 that is free flowing and readily suited for processing in a mold used to form an abrasive article. As mentioned above, the introduction of the agglomeration inhibitor agent to the abrasive mix after its formation acts as a lubricant agent that prevents grains of the abrasive mix from sticking together. An agglomeration inhibitor agent such as a fumed oxide has unique lubricant properties due to its thin surface area that inhibit it from adhering to the abrasive mix. The result of adding the agglomeration inhibitor agent toward the end of the process of forming the abrasive mix is that a three-dimensional network of non-adhering, free flowing, abrasive particles can be formed as illustrated in FIG. 5.

In addition to providing an abrasive mix that is free flowing and devoid of significant amounts of loose bond content, the process described in FIG. 1 can produce an abrasive article that is stronger than an article formed of the abrasive mix made from the conventional process and more suitable for aggressive applications where extreme durability and resistance to breakage are paramount. Non-reinforced yield strength is one measurement that skilled artisans have used to measure the strength of abrasive article. Non-reinforced yield strength as measured herein is attained by producing abrasive test articles in the form of approximately 0.5 inch by 0.5 inch bars. The test articles contain no items that are typically used for reinforcement, such as glass fibers, fiberglass webs, or the like. The bars are then broken on an Instron machine and a non-reinforced yield strength measurement in MPa units is obtained by a commercially available Data Acquisition System taking load and specimen dimension into account.

Figure 6:
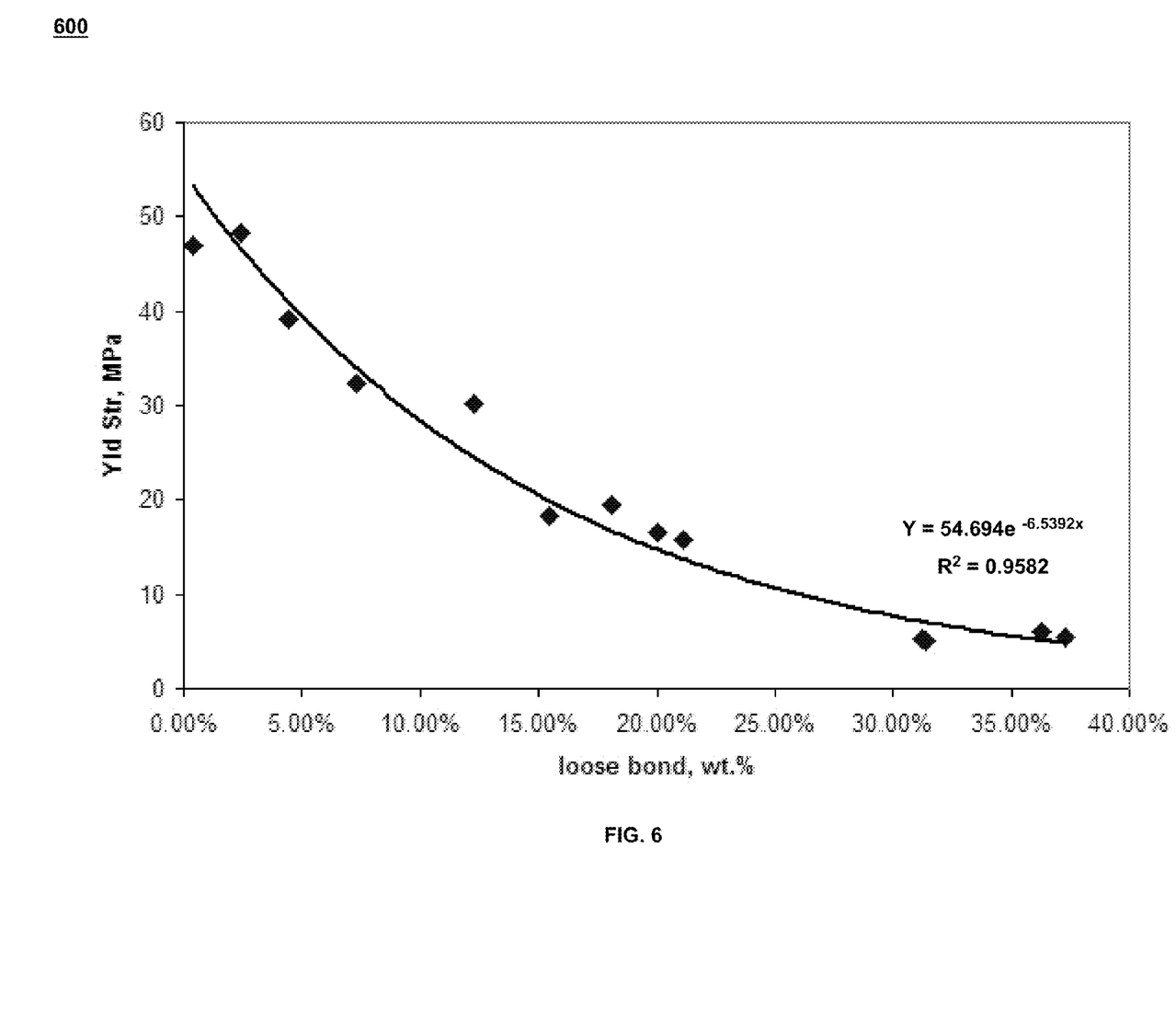
FIG. 6 is a plot illustrating the relationship between non-reinforced yield strength and loose bond content for an abrasive article made from the abrasive mix depicted in FIG. 1.

This approach in obtaining non-reinforced yield strength measurements was used herein on various abrasive articles formed from mixes with differing loose bond content percentages to develop a correlation between non-reinforced yield strength and loose bond content. FIG. 6 is a plot 600 illustrating the relationship between non-reinforced yield strength and loose bond content for an abrasive article made from the abrasive mix depicted in FIG. 1. As shown in FIG. 6, abrasive mixes with loose bond content less than about 9.9%, which were within the range produced by the process of FIG. 1, resulted in a non-reinforced yield strength that is greater than about 28 MPa. A non-reinforced yield strength of about 28 MPa to about 90 MPa is the general non-reinforced yield strength range for abrasive mixes having loose bond content that can be typically produced from the process of FIG. 1. For example, various embodiments of the disclosed abrasive articles exhibit non-reinforced yield strength of at least about 48 MPa, while other embodiments exhibited non-reinforced yield strength of at least about 39 MPa.

In general, the plot in FIG. 6 shows that there is an exponential relationship between non-reinforced yield strength and loose bond content in the mix with an $R^2$ value of approximately 96%. Essentially, the correlation illustrated in FIG. 6 indicates that loose bond content is undesirable and that it is desirable to have as little loose bond content as possible in the abrasive mix in order to maximize the non-reinforced yield strength. Because the $R^2$ value is approximately 96%, those skilled in the art will recognize that loose bond content is an important factor in influencing the non-reinforced yield strength of rough grinding abrasive article and that any other factor that could attribute to these non-reinforced yield strength values is minimal due to a 4% variation.

It is noted herein that the correlation illustrated in FIG. 6 is not effected by the eventual use of the abrasive mix in an abrasive article formed therefrom. An abrasive wheel product is one particular abrasive article that can be formed from the abrasive mix obtained from the process of FIG. 1. As is known in the art, abrasive wheel products come in a variety of sizes such as, for example, large diameter cutoff abrasive wheel products, medium diameter cutoff abrasive wheel products and small diameter cutoff abrasive wheel products. Although abrasive mixes formed from the process described in FIG. 1 are described with respect to use with abrasive wheel products, those skilled in the art will recognize that mixes formed from this process are suited for any organic abrasive article used in cutting, lapping, grinding, or polishing operations where it is necessary to have tools that are extremely strong, durable and resistant to breakage. Regardless of what article the abrasive mix is incorporated into, the correlation of non-reinforced yield strength and loose bond content as illustrated in FIG. 6 is not effected by this eventual use because the non-reinforced yield strength measurements are in MPa units which have been normalized per the surface area. If the measurements were interested in the load, then the type and size of the article would affect this correlation provided in FIG. 6.

Furthermore, although the abrasive articles disclosed herein have been characterized according to non-reinforced yield strength measurements according to the process described supra, those skilled in the art will appreciate that the abrasive mix described herein can be provided with reinforcing constituents, such as high strength glass fibers, fiber webs, or the like and, likewise, that the abrasive mix can be incorporated in a reinforced abrasive article containing layer(s) of reinforcing materials.

EXAMPLES

The following provides particular examples of abrasive mixes formed according to embodiments described herein.

Example 1

In this example, 215 lbs of alumina-zirconia abrasive grain was provided in a container to which was added 15 lbs of liquid resin. The abrasive grain and processing liquids were mixed to form wetted abrasive grains. In a separate container, the following organic bond constituents were mixed together: 39 lbs of a two-stage, powdered phenolic resin containing hexamethylenetetramine curing agent currently available from Durez Corporation of Addison, Tex. and 55 lbs of active and passive fillers, selected for an intended end use application. The contents of both containers were then combined and mixed to form an abrasive mix to which was added 1.2 lbs of fumed silica. The resulting abrasive mix exhibited improved packing density and loose bond characteristics.

Example 2

The process described in Example 1 was repeated with 215 lbs of alumina abrasive grain, 20 lbs of liquid resin, 39 lbs of Durez two stage, powdered phenolic resin containing hexamethylenetetramine curing agent, the same filler package as Example 1 and 1.7 lbs fumed silica. The resulting abrasive mix exhibited improved packing density and loose bond characteristics.

Example 3

Figure 7:
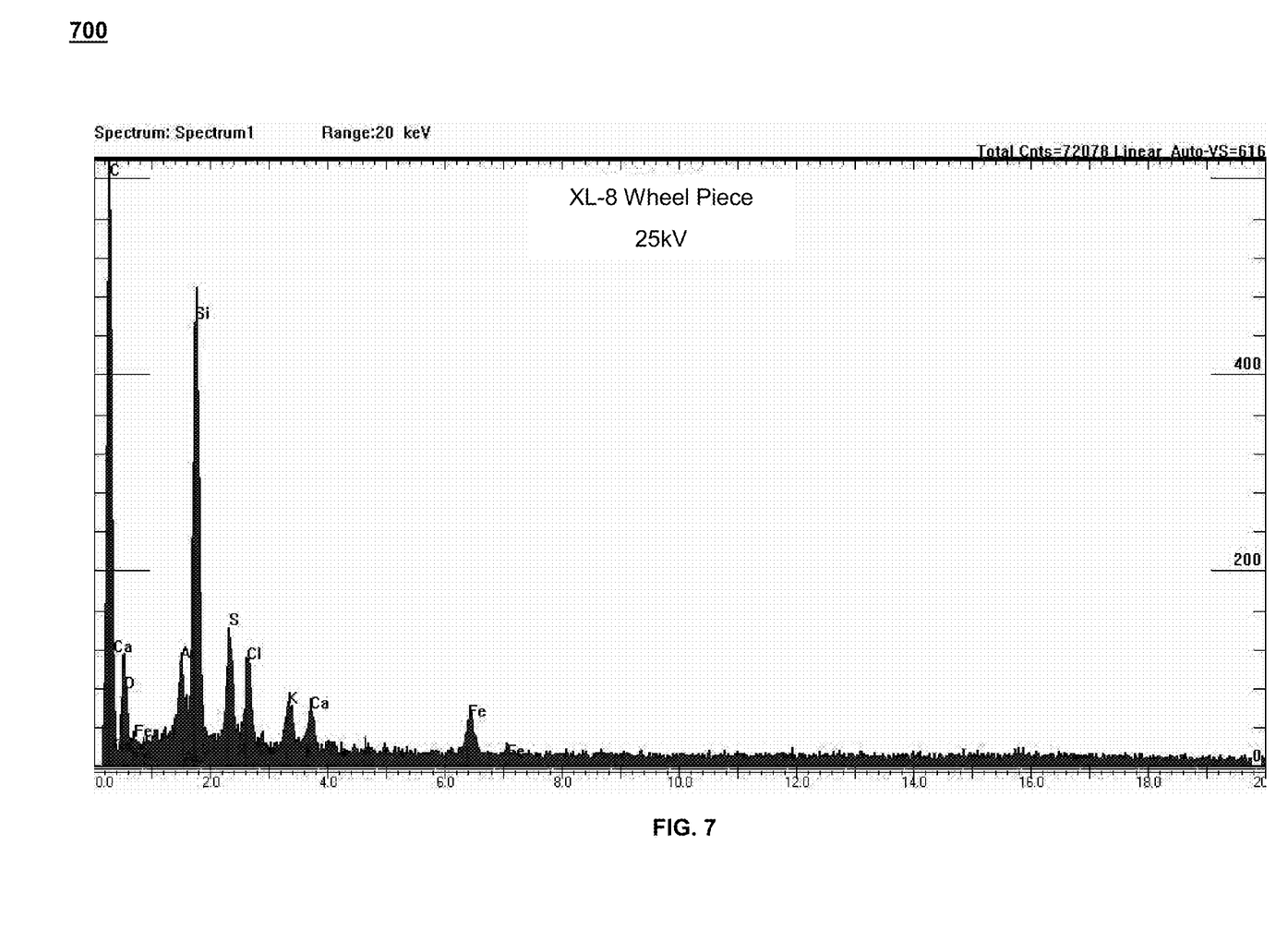
FIG. 7 is an energy dispersive x-ray spectroscopy scan of a surface of an abrasive wheel product that uses an abrasive mix formed from the process depicted in FIG. 1, that shows a strong presence of fumed silica.

In this example, the abrasive mixes from Examples 1 and 2 were used to produce large diameter cutoff abrasive wheel products that were tested to determine the presence of fumed silica from their surfaces. In particular, the abrasive mixes from Examples 1 and 2 were used in conjunction with a reinforcement constituent comprising fiber webs to each form a 63 inch abrasive wheel product. A one inch cube was cut from each abrasive wheel product and glued to small individual pieces of adhesive carbon tape. Each sample was placed in a specimen chamber of a scanning electron microscope and examined at separate instances. The scanning electron microscope was used to examine the surface of each sample at a first magnification of 295× and then at an increased magnification of 850×. Energy dispersive x-ray spectroscopy, which is a functionality provided with the scanning electron microscope, was used to analyze the energy of electrons returning from the surface of each sample viewed at the 850× magnification. The analysis provided by the energy dispersive x-ray spectroscopy results in a scan that shows the elemental composition of the samples at their surfaces. FIG. 7 shows an energy dispersive x-ray spectroscopy scan 700 of a surface of one of the abrasive wheel products, where the x-axis represents the intensity of the signals returned in the energy dispersive x-ray spectroscopy and the y-axis represents the energy scale. Scan 700 shows that there is a strong silicon (Si) peak which is indicative of the presence of fumed silica on the surface of the sample of the abrasive wheel product. The other peaks present in scan 700 include calcium (Ca), oxygen (O), aluminum (Al) sulfur (S), chlorine (Cl), potassium (K), iron (Fe) and carbon (C). Note that the smaller peaks (e.g., Ca, O, Fe, Al, S, Cl, K and Ca) are of less intensity in scan 700 and are indicative of the active and passive fillers used in the abrasive mix that formed the abrasive wheel product.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A plurality of abrasive particles comprising an abrasive mix, the abrasive mix comprising a mixture of abrasive grains and bond material, wherein the bond material is adhered to the abrasive grains, and
   wherein abrasive particles of the plurality of abrasive particles comprise a coating at the surface of the abrasive particles including an agglomeration inhibitor agent comprising fumed silica, the agglomeration inhibitor agent configured to inhibit the abrasive particles from adhering to each other, and
   wherein the abrasive grains have a loose bond content of about 0.1 wt. % to about 9.9 wt. % for the total weight of the abrasive mix.

2. The abrasive mix according to claim 1, wherein the agglomeration inhibitor agent is in a range of about 0.0001 to about 10 percent by weight of the abrasive mix.

3. The abrasive mix according to claim 1, wherein the mix comprises a loose packed density that is greater than about 1.56 g/cc.

4. The abrasive mix according to claim 3, wherein the loose packed density is at least about 1.69 g/cc.

5. An abrasive article made from the abrasive mix of claim 1.

6. The abrasive article of claim 5, having a non-reinforced yield strength that is at least about 28 MPa.

7. The abrasive article of claim 6, wherein the non-reinforced yield strength is at least about 48 MPa.

8. The abrasive article of claim 5, wherein the article comprises an abrasive wheel.

9. A bonded abrasive article, comprising: a plurality of abrasive particles comprising an abrasive mix, the abrasive mix comprising a mixture of abrasive grains and bond material, wherein the bond material is adhered to the abrasive grains, and wherein abrasive particles of the plurality of abrasive particles comprise a coating at the surface of the abrasive particles including an agglomeration inhibitor agent comprising fumed silica, the agglomeration inhibitor agent configured to inhibit the abrasive particles from adhering to each other, and wherein the abrasive grains have a loose bond content of about 0.1 wt. % to about 9.9 wt. % for the total weight of the abrasive mix, and wherein the abrasive article has a non-reinforced yield strength that is at least about 28 MPa.

10. The bonded abrasive article according to claim 9, wherein the non-reinforced yield strength is at least about 48 MPa.

11. The bonded abrasive article according to claim 9, wherein the bond material comprises a dry resin material.

12. The bonded abrasive article according to claim 11, wherein the bond material further comprises a filler material selected from the group consisting of active filler materials, inactive filler materials and combinations of the active and inactive filler materials.

13. The bonded abrasive article according to claim 9, wherein the lubricant agent is present in a range of about 0.0001 to about 10 percent by weight.

14. A method of forming an abrasive article, comprising the following steps:
a) providing abrasive grains;
b) introducing at least one processing liquid to the abrasive grains;
c) mixing the at least one processing liquid with the abrasive grains to form wetted abrasive grains;
d) adding and mixing a bond material with the wetted abrasive grains to form abrasive particles comprising a mixture of abrasive grains and bond material, wherein the bond material is adhered to the abrasive grains;
e) coating the abrasive particles with an agglomeration inhibitor agent comprising fumed silica to form a coated abrasive mix having a loose bond content that is between about 0.01 wt. % to about 9.9 wt. % for the total weight of the coated abrasive mix; and
f) forming the coated abrasive mix into the abrasive article.

15. The method according to claim 14, wherein step b) comprises adding a content of processing liquid that ranges from about 10 lbs to about 20 lbs per 300 lbs of mix.

16. The method according to claim 14, wherein the at least one processing liquid is selected from the group consisting of liquid resins, water, wax, resin modifiers, solvents and combinations thereof.

17. The method according to claim 14, wherein the loose bond content ranges from about 0.1% to about 5.0%.

18. The method according to claim 14, wherein the bond material comprises a dry resin material.

19. The method according to claim 14, wherein the agglomeration inhibitor agent is present in a range of about 0.0001 to about 10 percent by weight of the abrasive mix.

20. The method according to claim 14, wherein the abrasive mix comprises a loose packed density that is greater than about 1.56 g/cc.

21. The method according to claim 20, wherein the loose packed density is at least about 1.69 g/cc.

22. The method according to claim 14, wherein the abrasive mix comprises a wide distribution of abrasive grains ranging from small sized grains to large sized grains, the small sized grains interspersed with the large sized grains.

23. The method according to claim 22 wherein the small sized grains have an equivalent diameter that ranges from about 0.1 mm to about 3 mm and the large sized grains have a thickness that ranges from about 2.5 mm to about 6 mm.

* * * * *